Dec. 22, 1953          R. T. CLOUD          2,663,088
PENDULUM AND ACCELERATION COMPENSATION SYSTEM
Filed April 3, 1948
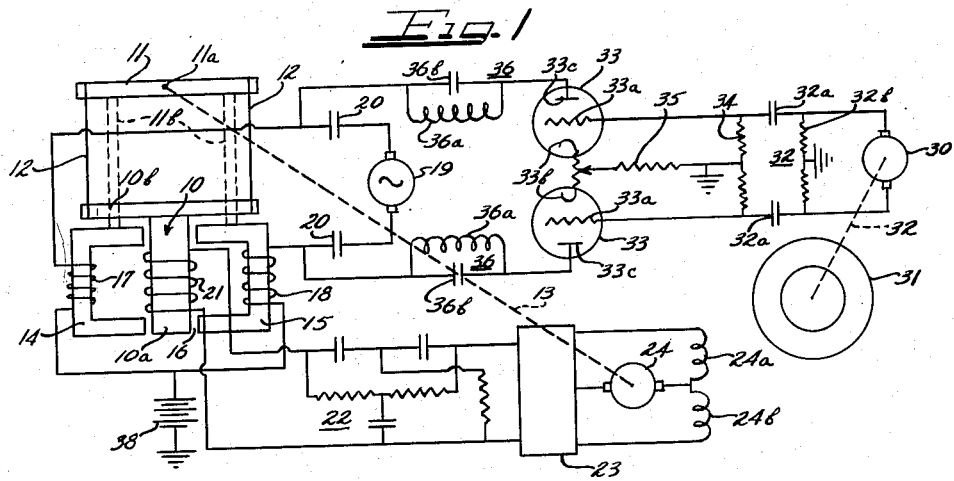
Inventor
RAYMOND T. CLOUD Patented Dec. 22, 1953

2,663,088

UNITED STATES PATENT OFFICE 2,663,088

PENDULUM AND ACCELERATION COMPENSATION SYSTEM

Raymond T. Cloud, Houston, Tex., assignor to North American Geophysical Co., Houston, Tex., a corporation of Texas Application April 3, 1948, Serial No. 18,776

17 Claims. (Cl. 33—220)

This invention relates to a measuring instrument of the gradometer type, and particularly to a gradometer for continuously measuring or indicating the inclination of a moving vehicle carrying the gradometer with respect to a horizontal or vertical plane. A gradometer of this type finds particular utility in seismic or geological surveying, inasmuch as the output indications of the gradometer may be integrated to provide a continuous indication of the elevation of the vehicle carrying the apparatus with respect to sea level at any point along the path traveled by the vehicle.

Gradometers for this purpose have been heretofore known and have generally embodied a pendulum which operates as the primary detecting device to detect changes in inclination of the vehicle, hence of the path traversed by the vehicle, with respect to the horizontal. Obviously, as the vehicle traverses a path of varying inclination with respect to the horizontal, the angular position of the pendulum with respect to the supporting apparatus, by which it is mounted on the vehicle will shift as a direct function of the instantaneous inclination of the path of the vehicle.

It has also been known that in pendulum controlled gradometers, the accuracy of indication of the gradometer is substantially impaired due to the effects of vehicle acceleration or de-acceleration upon the position of the pendulum. To obtain the high degree of accuracy required in apparatus of this type, it is necessary that the pendulum be compensated against vehicle acceleration forces. Apparatus of this general type has been heretofore disclosed, for example, note my prior Patent No. 2,362,616, issued November 14, 1944.

The pendulum and acceleration compensating systems heretofore utilized have been subject to several well known disadvantages. In the first place, it has been the practice to employ a pendulum having a long period and a damping of said pendulum approaching critical. As a result, such pendulum is slow acting, and when displaced, is slow in returning to the vertical or gravitationally neutral position, resulting in errors due to this action. Furthermore, the compensating arrangements heretofore employed generally constituted a current carrying coil which was coaxially mounted with respect to the pendulum and hence required that such coil be accurately centered in a magnetic air gap to produce the results required.

According to this invention, a novel pendulum structure and acceleration compensating arrangement is provided which permits the use of undamped pendulum having a very short period. As a result, the pendulum is extremely sensitive to variations in inclination of its supporting structure with respect to the horizontal and hence, when employed in a vehicle carried measuring apparatus, the road contours traversed by the vehicle are followed by the pendulum with great accuracy. Furthermore, the compensating arrangement provided by this invention does not require the accurate positioning of any coil element either with respect to the pendulum or with respect to a magnetic air gap in which the pendulum operates.

Another feature of this invention is the provision of a simplified circuit arrangement for electrically producing a pendulum acceleration compensating effect which is proportional to only the horizontal component of vehicle acceleration. Those skilled in the art will recognize that only this component of the vehicle acceleration tends to exert any disturbing effect upon the measuring pendulum.

Lastly, a pendulum construction embodying this invention may be fabricated in its entirety from unusually simple and rugged components, resulting in an assemblage that may be economically manufactured and yet which will provide highly accurate measurements under the adverse conditions of use to which these instruments are subjected in the field.

Accordingly, it is an object of this invention to provide an improved gradometer of the vehicle carried, pendulum type.

Another object of this invention is to provide for use in a gradometer or similar instrument, an improved pendulum system for continuously indicating changes in inclination of the pendulum support relative to the horizontal.

Still another object of this invention is to provide an improved compensating system for a vehicle carried pendulum which will operate to continuously and accurately neutralize the effects of vehicle acceleration forces upon the pendulum.

A particular object of this invention is to provide an improved electrical circuit for compensating a vehicle carried pendulum against vehicle acceleration forces, characterized by the utilization of only the horizontal component of vehicle acceleration for compensation purposes.

A further object of this invention is to provide an improved circuit arrangement for deriving from a voltage proportional to actual instantaneous vehicle acceleration a control voltage which is proportional to only the instantaneous horizontal component of vehicle acceleration.

The specific nature of this invention as well as other objects and advantages thereof will become apparent to those skilled in the art from the following detailed description of the annexed sheet of drawings which, by way of preferred example only, illustrate one specific embodiment of the invention.

On the drawings:

Figure 1 is a schematic diagram of a pendulum construction embodying this arrangement showing in addition circuit connections for operating such pendulum and effecting acceleration compensation thereof;

Figure 2 is a schematic circuit diagram of a modified arrangement for generating an acceleration compensating voltage for use in the system of Figure 1; and Figure 3 is a schematic view of the variable impedance device incorporated in the circuit of Figure 2 with symbols applied for circuit analysis purposes.

As shown on the drawings:

In accordance with this invention, a pendulum 10 is employed which is of generally T-shaped configuration having a stem portion 10a of magnetic material and a head portion 10b which is rigidly secured to the stem portion 10a or may be integrally formed therewith. The pendulum 10 is supported for gravitationally induced swinging movements from a suspension platform or support arm 11 by a pair of flexible support bands 12. Support arm 11 is medially pivoted at the point 11a upon any desired form of support structure (not shown) and the support bands 12 are respectively secured to the opposite ends of the support arm 11. While not limited thereto, the support bands 12 preferably constitute flat leaf spring elements. In practice, these bands 12 permit displacement of the pendulum 10 in the direction of vehicle movement but resist motion in other directions. Other spring supports would have utility, however, it will be appreciated that vertical vibration is undesirable and possibly unpredictable.

When the described construction is mounted on a vehicle, and assuming the support arm 11 is restrained against pivotal movement in a manner that will be later described, it is apparent that the pendulum 10 will shift its angular position relative to the support arm 11 as a function of the inclination of the vehicle with respect to the horizontal, hence, as a function of the vertical contour of the road traversed by the vehicle. Any tendency of the support arm 11 to pivot in response to the inclination of the vehicle is resisted by a shaft 13 or similar linkage, indicated schematically by the dotted line in Figure 1, which is suitably mechanically connected to the support arm 11.

A pair of magnetic structures 14 and 15 are mounted on the same support structure on which arm 11 is mounted by means of supports 11b and are provided to define a magnetic air gap 16 therebetween within which the armature portion 10a of the pendulum 10 is movable. The magnetic structures 14 and 15 are co-rotatable with arm 11, as schematically indicated by the dotted links 11b. While not limited thereto, the magnetic structures 14 and 15 may conveniently comprise substantially identical stacks of generally U-shaped laminations which are disposed in opposed relationship on opposite sides of the armature portion 10a so that gravitationally induced swinging movements of armature portion 10a cause it to tend to shift from a medial position between the magnetic structures 14 and 15 to positions respectively proximate to one or the other of the magnetic structures 14 and 15.

A pair of coils 17 and 18 are provided which respectively cooperate with magnetic structures 14 and 15 to produce magnetic fields therein which traverse the air gap 16 therebetween. The coils 17 and 18 are then energized in any suitable manner so as to produce substantially equal and opposite magnetic fields in the medial portions of the air gap 16. For example, an alternating current generator 19 may be provided which supplies current to the coils 17 and 18 in series through blocking condensers 20. The purpose of the condensers 20 will be hereafter described.

In accordance with this invention, a pick-up coil 21 is provided in cooperative relationship with the armature portion 10a so that a signal voltage will be induced in such coil whose direction and magnitude will depend upon the direction and extent of shift of the pendulum 10 relative to the air gap 16 defined by the magnetic structures 14 and 15. This voltage is utilized, through the medium of a conventional servo system, to effect an adjustment of the angular position of the support arm 11 and coil assembly 14—15 to continuously effect the return of the pendulum armature portion 10a to its medial position in the air gap 16, by rotating the coil assembly in the gravitational field to follow the pendulum armature 10a. Such servo system may conveniently comprise a filter network 22 adjusted to reject natural vibration frequencies of the pendulum and connected across the terminals of pick-up coil 21, an amplifier 23 energized by the output of the filter 22, and a servomotor 24 differentially driven by the output of amplifier 23. Servomotor 24 is mechanically connected, either directly or through gearing, to the shaft 13, which controls the angular position of the support arm 11 and coil assemblies 14 and 15. Servomotor 24 is preferably of the reversing field type, having a pair of control fields 24a and 24b connected in push-pull relationship in the output circuit of amplifier 23 so that the phase and magnitude of the voltage induced in the pick-up coil 21 determines the direction and extent of rotation of the motor 24 in conventional fashion. The angular adjustment of the support arm 11 and coil assemblies 14 and 15 effected by the motor 24 is arranged so that the motor 24 continuously adjusts the support arm 11 in the proper direction relative to the pendulum 10 so that the armature portion 10a of the pendulum is medially positioned in the air gap 16. As a result, the shaft 13 is angularly shifted both in direction and extent in exact correlation to the variations of inclination of the pendulum support structure with respect to the horizontal, hence in the case of a vehicle carried device, in accordance with variations in the vertical contour of the road being traversed. Such angular movement of the shaft 13 may be applied to well known apparatus (not shown) for continuously integrating the sine of such angular movement and thus affording an indication of variations in elevation of the path traversed by the vehicle.

It will be appreciated that the support arm 11 is not rigid with respect to the body of the vehicle with which the apparatus of the present invention is associated, but is supported in the vehicle by means of the shaft 13.

Thus, the arm 11 is at all times at right angles to the vertical component of the force of gravity, regardless of the angular position of the vehicle itself. This is due to the fact that the servomotor 24, controlled by the movable armature 10a of pendulum 10, rotates the framework of the follow-up system composed of the entire assembly including the support arm 11, the supports 11b and the magnetic structures 14 and 15. The pendulum 10, being suspended from the support arm 11 by the flexible supports of thin metal afforded by the support bands 12, will be positioned by the force of gravity so that the pick-up coil 21 on the armature portion 10a of the pendulum 10 will be aligned midway between the coils 17 and 18.

Accordingly, the support arm 11 will at all times be in the correct postion due to the action of the servomotor 24 and the acceleration induced forces will be effectively neutralized. In other words, the acceleration compensation concept of the present invention does not contemplate any shift or displacement of the pendulum from a vertical position. Vehicular acceleration forces are applied through the pivots of the pendulum, but because equal and opposite forces are applied to the suspended mass at the same time, there will be no turning moment about the pivots and the pendulum will remain vertical.

From the foregoing description, it is apparent that a pendulum structure embodying this invention may be readily designed to have a relatively short period and a minimum of damping. Therefore, the pendulum will follow variations in the vertical contour of the road traversed by the vehicle substantially instantaneously and with a much greater degree of accuracy than the long period, highly damped pendulums heretofore employed. By the same token, the pendulum construction of this invention would be equally sensitive to displacements produced by acceleration or deacceleration of the vehicle. For convenience in terminology, the term acceleration will hereafter be employed in its generic sense and should be understood to include both increases and decreases in speed of the vehicle.

To effect an accurate compensation of the movements of the pendulum 10 against the effects of vehicle acceleration, I provide an arrangement which operates according to the fundamental methods described and claimed in my copending application Serial No. 18,775, filed concurrently with this application. According to such method, two coils are disposed in inductive relationship to a metallic portion of the pendulum. A voltage is then produced which is a function of the acceleration of the vehicle and this acceleration voltage is differentially applied to the two coils so as to produce a differential magnetic field operating upon the adjacent portion of the pendulum in such manner as to produce a force in the pendulum in an amount and direction sufficiently to exactly compensate for the acceleration induced forces thereon.

In an apparatus embodying this invention, such method may be conveniently applied by imposing an acceleration compensating voltage upon the A. C. field producing coils 17 and 18. To avoid interaction between the field producing voltages and the acceleration compensating voltages, the acceleration compensating voltage may conveniently comprise a direct current voltage, but it is to be understood that A. C. voltages of different frequency may also be employed so long as suitable filtering arrangements are provided for isolating the acceleration voltage from the servomotor control circuit.

Thus, a direct current generator 30 is provided which is driven by a ground engaging wheel 31 through a suitable mechanical linkage 32. The output of D. C. generator 30 is applied to a differentiating network 32 comprising series connected condensers 32a and a parallel connected, grounded center tapped resistor 32b. The output of the differentiating network 32 is then applied to the grids 33a of amplifier tube 33 whose cathodes 33b are connected through a resistor 35 to the grounded center tap of an input resistor 34. Plates 33c of the amplifier tubes 33 are respectively connected through a filter network 36 to the coils 17 and 18 which are connected in push-pull. Plate current for the amplifier 33 is supplied by a battery 38 which is connected between ground and the common connection between coils 17 and 18. The filter elements 36 each constitute a tuned circuit comprising, for example a parallel connected inductance 36a and condenser 36b, which is turned to the frequency of the generator 19. Hence these filter units block the generator frequency from the acceleration voltage generating circuit. Likewise, the condensers 20 provided in series connection with the generator 19 prevent the application to the generator of the D. C. voltages produced by the acceleration voltage generating circuit. The amplifier tubes 33 are so arranged that normally equal direct current flow from battery 38 through each of coils 17 and 18 and the tubes 33 so that equal magnetic forces resulting from the direct current acceleration compensation voltage are exerted upon the armature portion 10a of the pendulum 10. Of course, if desired, the tubes 33 may be normally biased to cut-off and during periods of zero vehicle acceleration, no direct current will flow through the coils 17 and 18.

If the velocity of the vehicle changes in either direction, the acceleration induced voltage across the output terminals of the D. C. generator 30 will vary in direct relation thereto, and hence the condensers 32a will be either additionally charged or discharged. The potential drop across each half of the input resistor 34 is respectively impressed on the grids of the amplifier tubes 33 and one of such tubes will be rendered more conductive than the other, depending upon the direction of the change in vehicle velocity. Hence, the direct current flow in coils 17 and 18 will be unbalanced and one of such coils will carry relatively more direct current than the other. The circuit is so arranged that the unbalanced direct current flowing in coils 17 and 18 exerts a magnetic force on the armature portion 10a of the pendulum 10 which is in the proper direction and magnitude to exactly offset and neutralize the acceleration induced forces upon the pendulum. In this manner, all effects of vehicle acceleration may be completely balanced out of the measuring apparatus and the pendulum 10 will accurately tend to follow only variations in vertical contour of the road traversed by the vehicle.

The aforedescribed arrangement will function satisfactorily and with reasonable accuracy when the changes in inclination of the road contour from the horizontal are relatively small. However, those skilled in the art will recognize that the described arrangement is subject to an inherent error due to the fact that the compensation of the pendulum 10 is effected in proportion to the absolute magnitude of the change in the acceleration of the vehicle, while actually, the only portion of the vehicle acceleration which is effective in displacing the pendulum is the horizontally directed component thereof.

Referring to Figure 2, there is shown a modified arrangement for producing an acceleration compensating voltage in which a control voltage is produced which is proportional only to the horizontal component of the vehicle acceleration.

As in the arrangement of Figure 1, a wheel 31 of the vehicle is employed to drive the D. C. generator 30 through any suitable driving connection. The output of the generator is applied to a differentiating network comprising a series connected condenser 41 and a parallel connected, potentiometer type, variable impedance device 42. Potentiometer 42 may conveniently comprise a circularly disposed, non-linear resistance element 42a having a rotatable tap 42b cooperating therewith. The voltage developed across the movable tap 42b and one side of potentiometer 42 is applied across a grounded center tapped resistor 43 and thence applied in parallel to the grids 33a of amplifier tube 33. The plates 33c in the amplifier tube 33 are connected to the coils 17 and 18 on the pendulum in the same manner as heretofore described in connection with Figure 1.

With the described arrangement, the voltage applied to the grids of the amplifier tube 33 is a proportional amount of the voltage across potentiometer 42, which in turn is a function of the acceleration of the vehicle. In order that the voltages supplied to grids of the tubes 33 represent only the horizontal component of vehicle acceleration, it is necessary that the angular position of the rotary tap 42b be varied in fixed correlation to the angular position of the vehicle with respect to the horizontal. Such variation may be conveniently accomplished by coupling the rotary tap 42b to the shaft 13 controlling the angular position of the pendulum support arm 11. Such coupling may be conveniently accomplished by a shaft 45 and cooperating gears 46 and 47.

In other words, where the path of the vehicle is not horizontal, the velocity as measured by the generator 30 driven by the wheel 31 is not the horizontal component of acceleration which is desired for compensation. The desired component can be obtained by multiplying the measured velocity by the cosine of the instantaneous angle being traversed. As explained above, in connection with the structural components of Figure 2, the tapered potentiometer 42 is geared (gears 46 and 47) to the shaft 13 so as to attenuate the potential from the generator 30 proportional to the cosine of the inclination angle of the traversed roadway. Since the shaft 13 of Figure 2 is the same shaft 13 of Figure 1, the rotary tap 42b is rotated proportionately to the angle of the roadway.

In addition, it is necessary that the resistance per unit of circumferential length of the potentiometer 42 vary according to a fixed relationship. Since the horizontal component of acceleration is equal to the actual acceleration times the cosine of the angle of inclination, it follows that the voltage tapped off by the rotary tap 42b must bear the same cosine relationship to the total voltage existing across the terminals of potentiometer 42. Or, referring to the schematic diagram of Figure 3, at any position of the rotary tap 42b corresponding to an angle of inclination of $\theta$ degrees, the impedance from the one terminal of the potentiometer 42 to the position of the rotary tap 42b, is represented by $Z_1$ while the impedance from the other terminal of the potentiometer 42 to the position of the rotary tap 42b is represented by $Z_2$. As stated above, the necessary taper of impedance value along the potentiometer 42 in Figure 2 is such that $$\frac{Z_1}{Z_2} = \cos \theta$$

where, as shown in Figure 3:

$Z_1$ = that portion of resistance from point of rotary tap 42b contact to upper center of potentiometer 42;

$Z_2$ = that portion of resistance from rotary tap 42b contact to lower center of potentiometer 42;

$\theta$ = displacement angle of rotary tap 42b proportional to instantaneous angle of inclination of vehicle (rotary tap 42b at upper center of potentiometer 42b when inclination angle is equal to zero).

Referring further to Figure 3, $Z_1 + Z_2$ must equal $K$, the total resistance of one side of the potentiometer 42. Then by simple algebra, the following relationships may be derived:

$$Z_1 = \frac{K \cos \theta}{1 + \cos \theta}$$

$$Z_2 = \frac{K}{1 + \cos \theta}$$

The value $K$ must be selected such that $K/2$ is suitable for the differentiating circuit of which it is an element and also, for bridging across the grid resistances. For exemplary purposes, a suitable combination may employ a 0.1 microfarad value for condenser 41, a value of $K$ equal to 100,000 ohms and a grid resistance 43 equal to one megohm.

Alternatively, if it were desired to use a linear potentiometer in the place of non-linear potentiometer 42, the driving connection for the rotary tap 42b may be suitably constructed according to conventional arrangements so that movement of the rotary tap 42b would be proportional to the cosine of the angle of rotation of the shaft 13.

In either arrangement, the voltage applied to the grids of amplifier tubes 33 is an exact function of the horizontal component of vehicle acceleration and the currents conducted by the tubes 33 are therefore differentially modified according to the direction and amount of the vehicle acceleration. Such amplified differential currents flowing in the pendulum coils 17 and 18 effect the neutralization of acceleration forces on the pendulum 10 in the identical manner as has been heretofore described in connection with the modification of Figure 1.

It is therefore apparent that this invention provides an unusually simple, inexpensive, yet rugged and highly accurate measuring pendulum and acceleration compensating system for such pendulum. It is desired to particularly point out that the circuit arrangements hereindescribed for producing a signal voltage which is a function of only a horizontal component of the vehicle acceleration is in no manner limited to use with the specific pendulum construction illustrated herein but is equally applicable to other types of pendulum control measuring devices.

It will, of course, be apparent to those skilled in the art that various details of construction may be modified through a wide range without departing from the principles of this invention and it is, therefore, not the purpose to limit the patent granted hereon otherwise than necessitated by the scope of the appended claims.

I claim as my invention:

1. In a vehicle carried gradometer, a pair of spaced magnetic structures defining an air gap therebetween, a pair of coils respectively associated with said magnetic structures, means for energizing said coils to produce equal and opposite magnetic fields in the medial portions of said air gap, a freely suspended pendulum having a magnetic armature portion disposed in said air gap and gravitationally swingable between positions respectively proximate to said magnetic structures, a pick-up coil carried by said armature portion, a servomotor, means connecting said servomotor to said magnetic structures to shift said magnetic structures, and means for controlling said servomotor in response to voltages generated in said pick-up coil to continuously adjust said magnetic structures to maintain said armature portion in a predetermined position in said air gap, means for generating an acceleration voltage proportional to vehicle acceleration, and means for differentially modifying the magnetic field in said air gap as a function of said acceleration voltage, thereby producing a magnetic restoring force on said magnetic armature of said pendulum equal and opposite to any vehicle acceleration forces thereon.

2. In a vehicle carried gradometer, a pair of spaced magnetic structures defining an air gap therebetween, a pair of coils respectively associated with said magnetic structures, alternating current means for energizing said coils to produce equal and opposite magnetic fields in the medial portions of said air gap, a freely suspended pendulum having an armature portion disposed in said air gap and gravitationally swingable between positions respectively proximate to said magnetic structures, a pick-up coil surrounding said armature portion, a servomotor, means connecting said servomotor to said magnetic structures to shift said magnetic structures, means for controlling said servomotor in response to the voltages generated in said pick-up coil to continuously adjust said magnetic structures to maintain said armature portion in a predetermined position in said air gap wherein substantially zero voltage is generated in said pick-up coil, means for generating a direct current voltage proportional to vehicle acceleration, and means for applying said acceleration voltage to said coils to differentially modify the magnetic fields in said air gap as a function of said acceleration voltage, thereby producing magnetic forces on said pendulum equal and opposite to any vehicle acceleration forces thereon.

3. In a vehicle carried gradometer, a medially pivoted support bar, a pendulum element, a pair of flexible means suspending said pendulum from points on said support bar respectively disposed on opposite sides of the pivot point, whereby said pendulum element may freely swing under gravitational forces, an armature portion on said pendulum element, a magnetic structure shiftable with said support bar, means on said magnetic structure for producing opposed magnetic fluxes traversing said armature portion, said fluxes being of equal intensity at the gravitational neutral position of said pendulum, a pick-up coil on said armature portion, a servomotor drivingly connected to said support bar to adjust the angular position of said support bar about its said medial pivot, means for controlling said servomotor in response to the voltages induced in said pick-up coil to continuously angularly adjust said support bar and said magnetic structure to maintain said pendulum element in a flux neutralizing position, means for generating a voltage proportional to vehicle acceleration and means for differentially modifying the magnetic fields in said armature portion as a function of said acceleration voltage, thereby producing magnetic forces on said pendulum element equal and opposite to vehicle acceleration forces thereon.

4. Acceleration compensating apparatus for a vehicle carried pendulum, comprising a pendulum having a magnetic armature portion, a pair of coils disposed adjacent said armature portion and respectively arranged to produce oppositely directed magnetic forces in said armature portion tending to shift said pendulum from a gravitationally neutral position, proportionating means producing a voltage proportional to the horizontal component of the vehicle acceleration, and differentiating circuit means for differentially energizing said coils by said voltage to continuously produce magnetic forces in said pendulum equal and opposite to horizontal component of vehicle acceleration induced forces.

5. A vehicle carried measuring apparatus comprising a pendulum having a magnetic armature portion, a pair of coils disposed adjacent said armature portion and respectively arranged to produce oppositely directed magnetic forces on said armature portion tending to shift said pendulum from a gravitationally neutral position, means for producing a first voltage proportional to the vehicle acceleration, means responsive to the instantaneous vehicle inclination with respect to the horizontal for deriving from said first voltage a second voltage proportional to the horizontal component of the vehicle acceleration, and means for differentially energizing said coils by said second voltage to continuously produce magnetic forces on said pendulum equal and opposite to the horizontal component of vehicle acceleration induced forces.

6. Apparatus for measuring an acceleration component of a vehicle and adapted for use in a gradometer comprising means for generating a voltage proportional to vehicle acceleration, means producing a mechanical movement proportional to the instantaneous inclination of the vehicle relative to the horizontal, a variable impedance device having input terminals energized by said voltage, output terminals, and a shiftable control element, and means connecting said last mentioned means to said shiftable control element in driving relation, whereby the voltage across said output terminals of the variable impedance device is a function of the horizontal component of vehicle acceleration.

7. Apparatus for measuring an acceleration component of a vehicle and adapted for use in a gradometer comprising means generating a voltage proportional to vehicle acceleration, a variable impedance element having an angularly shiftable control member, means for shifting said control member as a function of the instantaneous inclination of the vehicle with respect to the horizontal, and means for energizing said variable impedance element by said voltage, thereby producing an output voltage proportional to the horizontal component of the vehicle acceleration.

8. The combination defined in claim 6 wherein said variable impedance element comprises a potentiometer having a movable tap as the control member, the impedance of said potentiometer varying along the length thereof according to the relation $$\frac{Z_1}{Z_2} = \cos\theta$$

where $Z_1$ is the impedance from one end of the potentiometer to the movable tap, $Z_2$ is the impedance from the other end of the potentiometer to the movable tap, and $\theta$ is the angle of inclination of the vehicle with respect to the horizontal corresponding to such position of the movable tap.

9. The combination defined in claim 7 wherein said impedance element comprises a circular arranged potentiometer having a rotationally movable tap as a control member, the impedance of said potentiometer varying along the circumferential length thereof according to the relation of $$\frac{Z_1}{Z_2} = \cos\theta$$

where $Z_1$ is the impedance from one end of the potentiometer to said movable tap, $Z_2$ is the impedance from the diametrically opposed end of the potentiometer to said rotary tap, and $\theta$ is the angle of inclination of the vehicle with respect to the horizontal corresponding to such position of the rotary tap.

10. A vehicle carried measuring apparatus comprising a pendulum having a magnetic armature portion, a pair of coils disposed adjacent said armature portion and respectively arranged to produce oppositely directed magnetic forces on said armature portion, said forces respectively tending to shift said pendulum in opposite directions from a gravitationally neutral position, means for producing a first voltage proportional to the vehicle acceleration, a variable impedance element having a shiftable control member, means controlled by said pendulum for shifting said control member as a function of the instantaneous inclination of the vehicle with respect to the horizontal, means for energizing said variable impedance element by said first voltage, thereby producing an output voltage proportional to the horizontal component of the vehicle acceleration, and means for differentially energizing said coils by said output voltage to continuously produce magnetic forces on said pendulum equal and opposite to the horizontal component of vehicle acceleration induced forces.

11. In a vehicle carried gradometer, a pair of spaced magnetic structures defining an air gap therebetween, a pair of coils respectively associated with said magnetic structures, means for energizing said coils to produce equal and opposite magnetic fields in the medial portions of said air gap, a freely suspended pendulum having a magnetic armature portion disposed in said air gap and swingable between positions respectively proximate to said magnetic structures, a pick-up coil surrounding said armature portions, a servomotor, means connecting said servomotor in driving relation to said magnetic structures to shift said magnetic structures to follow said pendulum, means for controlling said servomotor in response to the voltage generated in said pick-up coil to continuously adjust said magnetic structures to maintain said armature portion in a predetermined position in said air gap, means for generating a voltage proportional to a vehicle acceleration, a variable impedance element having a shiftable control member, means connecting said servomotor in driving relation to said shiftable control member, and means connecting said voltage generating means to said pair of coils through said variable impedance element to differentially modify said magnetic fields as a function of the horizontal component of the vehicle acceleration, thereby inducing a neutralizing force to compensate against the acceleration forces on said pendulum.

12. The combination defined in claim 11 wherein said variable impedance element comprises a potentiometer having a movable tap as the control member, the impedance of said potentiometer varying along the length thereof according to the relation $$\frac{Z_1}{Z_2} = \cos\theta$$

where $Z_1$ is the impedance from one end of the potentiometer to the movable tap, $Z_2$ is the impedance from the other of the potentiometer to the movable tap, and $\theta$ is the angle of inclination of the vehicle with respect to the horizontal corresponding to such position of the movable tap.

13. In vehicle-carried apparatus for continuously measuring the inclination of a moving vehicle, means to produce a signal voltage in response to variations of inclination from a vehicle inclination reference plane, means to generate an acceleration voltage proportional to vehicle acceleration, means to modify said acceleration voltage in response to the instantaneous inclination of the vehicle relative to the horizontal to produce an output voltage proportional to the horizontal component of vehicle acceleration, means to modify said signal voltage in response to variations in said output voltage, and measuring means to continuously indicate the quantitative value of said variations of inclination in response to said compensated signal voltage.

14. A vehicle-carried apparatus for continuously measuring the inclination of a moving vehicle comprising, in combination, a pair of spaced magnetic structures defining an air gap therebetween, a pair of coils respectively associated with said magnetic structures, means for energizing said coils to produce equal and opposite magnetic fields in the medial portions of said air gap, a freely suspended pendulum having an armature portion disposed in said air gap and gravitationally swingable between positions respectively proximate to said magnetic structures, a pick-up coil surrounding said armature portion, a follow-up arm supporting said magnetic structures and having said pendulum suspended therefrom, a servomotor having a driven connection with said follow-up arm, means for controlling said servomotor in response to the voltages generated in said pick-up coil to continuously adjust said follow-up arm to maintain said armature portion of said pendulum in a predetermined position in said air gap, means for generating an acceleration voltage proportional to vehicle acceleration, a variable impedance device having input terminals energized by said acceleration voltage and output terminals, a shiftable control element therefor, a coupling between said follow-up arm and said shiftable control element to adjust said element in proportion to the instantaneous inclination of the vehicle relative to the horizontal, the voltage across said output terminals being a function of the horizontal component of vehicle acceleration, circuit means energizable by said output voltage to differentially modify the magnetic field in said air gap to produce a magnetic force on said pendulum equal and opposite to the horizontal component of any vehicle acceleration forces action thereon, and means associated with said follow-up arm to measure the compensated instantaneous inclination of said vehicle.

15. In a vehicle-carried apparatus for continuously measuring the inclination of a moving vehicle, a follow-up arm on said vehicle, electromagnetic means supported by said arm to establish a magnetic reference field, a pendulum freely suspended from said arm, a pick-up coil on said pendulum to produce a voltage in response to gravitationally induced variations from a vehicle inclination reference plane, a servo mechanism energizable by said voltage and connected to said follow-up arm to adjust the physical positioning of said electromagnetic means and said pendulum in response to said voltage to obtain a quantitative measurement of said variations, means to generate an acceleration voltage proportional to vehicle acceleration, a variable impedance device energizable by said acceleration voltage, adjustment means for said variable impedance device having a driven connection with said follow-up arm to be adjusted in response to the instantaneous inclination of the vehicle relative to the vehicle inclination reference plane, said variable impedance device thereby producing an output voltage in response to the horizontal component of vehicle acceleration to modify the magnetic reference field in response to said output voltage, and a magnetic armature carried by the pendulum movable in said magnetic field in response to forces induced therein whereby compensated measurement of vehicle inclination may be obtained.

16. A gradometer for a vehicle movable on a translatory path comprising a pendulum having a magnetizable armature portion, a pick-up coil carried by said armature portion, spaced apart field producing means around said armature portion, pick-up circuit means connected to said pick-up coil and said field producing means and a servomotor controlled thereby, said servomotor connected to said field producing means to maintain said pendulum and said field producing means in predetermined alignment in response to voltages induced in said pick-up coil, and acceleration responsive circuit means connected to said field producing means including a signal voltage producing means to generate an electric signal voltage responsive to acceleration of the vehicle along its translatory path, said field producing means operable to induce a restoring force in said armature to compensate the pendulum against translatory acceleration effects in the vehicle.

17. A gradometer as defined in claim 16 and means to control the acceleration induced signal voltage as a function of the horizontal component of vehicle acceleration only.

RAYMOND T. CLOUD.

References Cited in the file of this patent

UNITED STATES PATENTS

| Number | Name | Date |
|---|---|---|
| 905,781 | Baldwin | Dec. 1, 1908 |
| 910,244 | Stuart | Jan. 19, 1909 |
| 1,109,667 | Dikeman | Sept. 8, 1914 |
| 1,727,388 | Affel | Sept. 10, 1929 |
| 1,728,904 | Herr | Sept. 17, 1929 |
| 1,988,458 | Minorsky | Jan. 22, 1935 |
| 2,111,643 | Salvatori | Mar. 22, 1938 |
| 2,175,631 | Koster | Oct. 10, 1939 |
| 2,216,086 | Meenan | Sept. 24, 1940 |
| 2,362,616 | Cloud | Nov. 14, 1944 |
| 2,371,626 | Kecskemeti | Mar. 20, 1945 |
| 2,382,993 | Haskins | Aug. 21, 1945 |
| 2,384,348 | Schweitzer, Jr. | Sept. 4, 1945 |
| 2,396,617 | Von den Steinen | Mar. 12, 1946 |
| 2,405,049 | Pattee | July 30, 1946 |
| 2,419,063 | Fischer | Apr. 15, 1947 |
| 2,446,567 | White et al. | Aug. 10, 1948 |
| 2,492,244 | Shivers | Dec. 27, 1949 |